(12) United States Patent
Nakami

(10) Patent No.: US 7,324,701 B2
(45) Date of Patent: Jan. 29, 2008

(54) IMAGE NOISE REDUCTION (75) Inventor: Yoshihiro Nakami, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 788 days.

(21) Appl. No.: 10/743,965

(22) Filed: Dec. 22, 2003

(65) Prior Publication Data
US 2004/0190787 A1 Sep. 30, 2004

(30) Foreign Application Priority Data
Dec. 27, 2002 (JP) ............... 2002-379035

(51) Int. Cl.
G06K 9/40 (2006.01)
H04N 5/00 (2006.01)

(52) U.S. Cl. ............ 382/262; 382/264; 382/275; 348/606

(58) Field of Classification Search ......... 382/162, 382/167, 176, 260–264, 266, 269, 275, 282; 348/447, 463, 606, 607, 618–623, 625, 699, 348/700
See application file for complete search history.

(56) References Cited

U.S. PATENT DOCUMENTS

| | | | | |
|---|---|---|---|---|
| 5,142,592 A * | 8/1992 | Moler | ............ | 382/200 |
| 5,367,385 A * | 11/1994 | Yuan | ............ | 358/465 |
| 5,502,710 A * | 3/1996 | Washizawa et al. | ............ | 369/126 |
| 5,512,956 A | 4/1996 | Yan | | |
| 6,915,024 B1 * | 7/2005 | Maurer | ............ | 382/274 |
| 7,003,174 B2 * | 2/2006 | Kryukov et al. | ............ | 382/266 |
| 7,110,612 B1 * | 9/2006 | Wang | ............ | 382/262 |
| 7,167,595 B2 | 1/2007 | Hiroshige et al. | | |
| 2002/0159650 A1 | 10/2002 | Hiroshige et al. | | |
| 2002/0172431 A1 | 11/2002 | Atkins et al. | | |

FOREIGN PATENT DOCUMENTS

| | | |
|---|---|---|
| EP | 0 920 221 | 6/1999 |
| EP | 1 054 350 | 11/2000 |
| EP | 1 213 928 | 6/2002 |

(Continued)

OTHER PUBLICATIONS

Abstract of Japanese Patent Publication No. 03-258161, Pub. Date: Nov. 18, 1991, Patent Abstracts of Japan.

(Continued)

Primary Examiner—Kanjibhai Patel
(74) Attorney, Agent, or Firm—Martine Penilla & Gencarella, LLP (57) ABSTRACT An image processing apparatus determines whether or not a target pixel TP which is the object of the smoothing process is an edge-forming pixel based on the edge level (gradient g). If the pixel is determined to be an edge-forming pixel, the smoothing process employs an elliptical median filter instead of a moving average filter. The median filter MF has an elliptical reference area RA that is tilted (angled) to match the orientation of the edge Eg (edge angle), allowing the smoothing process to be carried out without compromising the edge components. The angle of the edge Eg is thus determined in the smoothing process, a median filter MF with an angle matching the determined edge angle is selected, and the selected median filter MF is used to carry out the smoothing process on target pixels TP which are edge-forming pixels.

12 Claims, 8 Drawing Sheets

FOREIGN PATENT DOCUMENTS

| JP | 03-258161 | 11/1991 |
|---|---|---|
| JP | 03-291061 | 12/1991 |
| JP | 06-260889 | 9/1994 |
| JP | 07-231450 | 8/1995 |
| JP | 11-220632 | 8/1999 |
| WO | WO 02/05544 | 7/2000 |

OTHER PUBLICATIONS

Abstract of Japanese Patent Publication No. 03-291061, Pub. Date: Dec. 20, 1991, Patent Abstracts of Japan.

Abstract of Japanese Patent Publication No. 11-220632, Pub. Date: Aug. 10, 1999, Patent Abstracts of Japan.

"Image Pre-processing: Local pre-processing," XP-002339362, Retrieved from the Internet (URL: http://www.icaen.uiowa.edu/(dip/LECTURE/PreProcessing3.html), pp. 1-22, Mar. 8, 2000.

Abstract of Japanese Patent Publication No. 2002044473, Pub. Date: Feb. 8, 2002, Patent Abstracts of Japan.

Abstract of Japanese Patent Publication No. 06-260889, Pub. Date: Sep. 16, 1994, Patent Abstracts of Japan.

Abstract of Japanese Patent Publication No. 07-231450, Pub. Date: Aug. 29, 1995, Patent Abstracts of Japan.

* cited by examiner

| -1 | 0 | 1 |
|----|---|---|
| -1 | 0 | 1 |
| -1 | 0 | 1 |

| 1  | 1  | 1  |
|----|----|----|
| 0  | 0  | 0  |
| -1 | -1 | -1 |

| -1 | 0 | 0 | 0 | 1 |
|----|---|---|---|---|
| 0  | 0 | 0 | 0 | 0 |
| -1 | 0 | 0 | 0 | 1 |
| 0  | 0 | 0 | 0 | 0 |
| -1 | 0 | 0 | 0 | 1 |

| 1  | 0 | 1  | 0 | 1  |
|----|---|----|---|----|
| 0  | 0 | 0  | 0 | 0  |
| 0  | 0 | 0  | 0 | 0  |
| 0  | 0 | 0  | 0 | 0  |
| -1 | 0 | -1 | 0 | -1 |

| Target Pixel | Processed pixel value in embodiment | Processed pixel value in conventional example | Gradient orientation θ |
|---|---|---|---|
| TP | 128 | 111 | 51° |
| TPn1 | 128 | 101 | 56° |
| TPn2 | 96 | 83 | 69° |

IMAGE NOISE REDUCTION

BACKGROUND OF THE INVENTION

1. Field of the Invention

The present invention relates to an image processing apparatus for executing a noise reduction process to images, and to a method for reducing noise in images.

2. Description of the Related Art

In digital style cameras and the like which produce digital images using photoelectric transducers such as CCDs, it is known that noise tends to be produced in images which are obtained, as a result of the CCD properties, when the ISO sensitivity is increased under dark photographing conditions of dark photographed objects. Noise produced in portions of images corresponding to space and skin, which require smooth gray scale, significantly lowers evaluation of images. A number of conventional noise reduction techniques have thus been proposed and put to practical use. An example of a widely used method is to smooth images by using a moving average filter to smooth the image gray scale.

However, images often contain contours (edge components), and the use of averaging filters while disregarding edge components results in the problem of blurred and indistinct contours. To solve this problem, smoothing processes which avoid contours have been proposed, but as a result of the moving average filter characteristics, the appropriate use of a smoothing process in areas with unexpected contours can still affect the contours, making it impossible to execute a satisfactory smoothing process that does not affect contours.

Meanwhile, median filters are capable of executing a smoothing process without compromising edges, but the computing process is extremely time-consuming, making this an impractical alternative. There is thus a need for a smoothing process that would involve lower computer processing demands and that would be capable of reducing the noise produced in images without causing the contours in images to become blurred and indistinct.

SUMMARY OF THE INVENTION

To address this, an object of the invention is to bring about natural, smooth color reproduction by rapidly reducing or eliminating noise in images without compromising the contours in images.

To address these issues, a first aspect of the invention provides a method for executing a noise reduction process in digital images. The method in the first aspect of the invention comprises detecting the edges contained in an image, determining the orientation that is the direction in which the detected edges are formed, and applying a smoothing filter to the detected edges, wherein the smoothing filter has an extraction area in the same direction as the determined edge orientation.

According to the method in the first aspect of the invention, a smoothing filter with an extraction area in the same direction as the orientation of the edges is applied to the detected edges to execute the smoothing process, thereby bringing about natural, smooth color reproduction by rapidly reducing or eliminating noise produced on images (smoothing process) without compromising the contours in the image.

The smoothing filter in the method of the first aspect in the invention may have an extraction area which is wider in the direction parallel to the orientation of an edge than in the direction perpendicular to the orientation of the edge. The use of a smoothing filter with such an extraction area (reference area) enables a smoothing process in which less time is needed to compute the smoothing filter, without compromising the edges.

The smoothing filter in the method of the first aspect in the invention may be a median filter. This will enable a smoothing process in which the edge-forming pixels are preserved in keeping with the above smoothing filter orientation properties.

The first aspect of the invention may also be embodied as an image processing apparatus for executing a noise reduction process to digital images. The image processing apparatus pertaining to the first aspect of the invention comprises edge detection logic for detecting edges contained in images, edge angle determination logic for determining the orientation of detected edges, and smoothing logic for applying a smoothing filter with an extraction area in the same direction as the determined orientation of detected edges.

The apparatus pertaining to the first aspect of the invention has the same functions and effects as the method in the first aspect of the invention, and can be worked in a variety of aspects in the same manner as the method in the first aspect of the invention.

The first aspect of the invention may also be embodied as a computer readable medium that stores a program for executing a noise reduction process to digital images. The program stored on the computer readable medium pertaining to the first aspect of the invention is executed on a computer to implement a function for detecting edges contained in images, a function for determining the orientation of detected edges, and a function for applying a smoothing filter to the detected edge, wherein the smoothing filter has an extraction area in the same direction as the determined orientation of detected edges.

The computer readable medium pertaining to the first aspect of the invention has the same functions and effects as the method in the first aspect of the invention, and can be worked in a variety of aspects in the same manner as the method in the first aspect of the invention.

A second aspect of the invention provides a method for executing a noise reduction process to images composed of a plurality of pixels. The method in the second aspect of the invention comprises finding the edge level in target pixels that are the object of the smoothing process, determining the edge angle that is the angle of an array of edge-forming pixels including the target pixels based on the calculated edge level, obtaining a filter that has orientation properties extracting pixels in a given direction as reference pixels and matching the determined edge angle; and executing a first smoothing process on the target pixels using the filter that has been obtained.

According to the method in the second aspect of the invention, filters with orientation properties extracted using pixels in a given direction as reference pixels are employed to execute the smoothing process on the target pixels, thereby bringing about natural, smooth color reproduction by rapidly reducing or eliminating noise produced on images without compromising the contours in the image.

The second aspect of the invention may also be embodied as an image processing apparatus for executing a noise reduction process to digital images. The image processing apparatus pertaining to the second aspect of the invention comprises edge detection logic for detecting edges contained in the images, edge angle determination logic for determining the orientation of the detected edges, and smoothing logic for applying a smoothing filter to the detected edges, wherein the smoothing filter has an extraction area in the same direction as the determined orientation of detected edges.

The apparatus pertaining to the second aspect of the invention has the same functions and effects as the method in the second aspect of the invention, and can be worked in a variety of aspects in the same manner as the method in the second aspect of the invention.

The second aspect of the invention may also be embodied as a computer readable medium that stores a program for executing a noise reduction process to images composed of a plurality of pixels. The program stored on the computer readable medium pertaining to the second aspect of the invention is executed on a computer to implement a function for calculating the edge level in the target pixels that are the object of the smoothing process, a function for determining the edge angle that is the angle of an array of edge-forming pixels including the target pixels based on the calculated edge level, a function for obtaining a filter that has orientation properties extracted using pixels in a given direction as reference pixels and has orientation properties matching the determined edge angle, and a function for executing a smoothing process on the target pixels using the filter that has been obtained.

The computer readable medium pertaining to the second aspect of the invention has the same functions and effects as the method in the second aspect of the invention, and can be worked in a variety of aspects in the same manner as the method in the second aspect of the invention.

A third aspect of the invention provides a method for executing a noise reduction process to images composed of a plurality of pixels. The method in the third aspect of the invention comprises finding the edge level in target pixels which are the object of the smoothing process, calculating the gradient of the target pixels based on the calculated edge level, obtaining a filter matching an edge angle on the image using the calculated gradient based on a predetermined relationship between the edge angles and the gradients, wherein the edge angle is an angle of an array of edge-forming pixels on the image, wherein the filter has orientation properties that extracts pixels oriented in the same angle direction as the edge angle, and executing a first smoothing process on the target pixels using the filter that has been obtained.

According to the method in the third aspect of the invention, the gradient of target pixels is used as reference information to select a filter with orientation properties extracted using as reference pixels those pixels oriented in the same angle direction as the edge angle, which is the angle of an array of edge-forming pixels on the image, and this filter is employed to execute the smoothing process on the target pixels, thereby bringing about natural, smooth color reproduction by rapidly reducing or eliminating noise produced on images without compromising the contours in the image.

The third aspect of the invention may also be embodied as an image processing apparatus for executing a noise-reduction process to images composed of a plurality of pixels. The image processing apparatus pertaining to the third aspect of the invention comprises edge level calculating logic for calculating the edge level in target pixels that are the object of the smoothing process, gradient calculating logic for calculating the gradient of the target pixels based on the calculated edge level, memory logic for storing a plurality of filters associated with the gradient for a plurality of edge angles, wherein the each filter has orientation properties that extracts pixels oriented in the same angle direction as the edge angle, which is the angle of an array of edge-forming pixels on the image, filter selection logic for selecting a filter matching the edge angle on the image from the memory logic based on the calculated gradient, and smoothing logic for executing a smoothing process on the target pixels using the selected filter.

The apparatus pertaining to the third aspect of the invention has the same functions and effects as the method in the third aspect of the invention, and can be worked in a variety of aspects in the same manner as the method in the third aspect of the invention.

The third aspect of the invention may also be embodied as a computer readable medium that stores a program for executing a noise reduction process to images composed of a plurality of pixels. The program stored on the computer readable medium pertaining to the third aspect of the invention is executed on a computer to implement a function for calculating the edge level in target pixels which are the object of the smoothing process, a function for calculating the gradient of the target pixels based on the calculated edge level, a function for obtaining a filter matching an edge angle on the image using the calculated gradient based on a predetermined relationship between the edge angles and the gradients, wherein the edge angle is an angle of an array of edge-forming pixels on the image, wherein the filter has orientation properties that extracts pixels oriented in the same angle direction as the edge angle, and a function for executing a smoothing process on the target pixels using the filter that has been obtained.

The computer readable medium pertaining to the third aspect of the invention has the same functions and effects as the method in the third aspect of the invention, and can be worked in a variety of aspects in the same manner as the method in the third aspect of the invention.

In the method in the second and/or third aspects of the invention, the filter may have an extraction area which is wider in the parallel direction parallel than in the direction perpendicular to a given direction. The use of a smoothing filter with such an extraction area (reference area) enables a smoothing process in which less time is needed to compute the smoothing filter, without compromising the edges.

The filter in the method of the second and/or third aspects of the invention may be a median filter. This will enable a smoothing process in which the edge-forming pixels are preserved in keeping with the above smoothing filter orientation properties.

The method in the second and/or third aspects of the invention may further comprise calculating the dispersion value of the target pixels when the calculated edge level is lower than the prescribed edge level, and executing a second smoothing process on the target pixels using a moving average filter having extraction areas that are smaller as the calculated dispersion value increases. In this case, the filter size can be changed using dispersion values which change according to the smoothness of the image, thereby enabling a noise reduction process (smoothing process) without compromising the edge characteristics in target pixels even if it cannot be determined whether or not those pixels are edge-forming pixels.

The method in the second and/or third aspects of the invention may further comprise separating the pixel values of the image by color difference components and brightness components, wherein the edge level of the target pixels is calculated by calculating edge levels for the color difference and brightness components, and the edge level of the target pixels is the greatest edge level among the calculated edge levels, the dispersion value of the target pixels is calculated by calculating the dispersion values for the color difference and brightness components, and the dispersion value of the target pixels is the greatest dispersion value among the calculated dispersion values, and the first and second smoothing process are only executed on the color difference components of the target pixels. This can prevent blurring associated with changes in brightness, and can appropriately eliminate or reduce color noise.

DESCRIPTION OF THE PREFERRED EMBODIMENTS

The image processing apparatus and noise reduction process of the invention are illustrated in the following embodiments with reference to the drawings.

Figure 1:
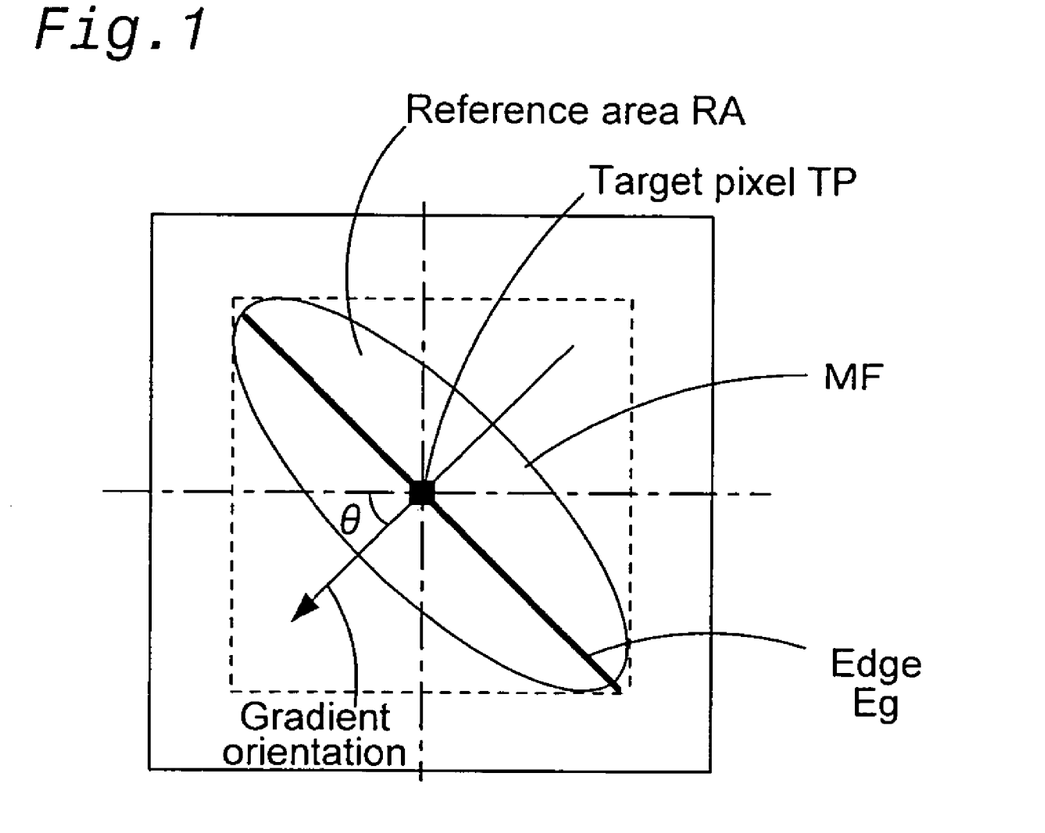
FIG. 1 illustrates the characteristics of the smoothing process executed on pixels forming edges by the image processing apparatus in an embodiment of the invention.

Features of the noise reduction process executed by the image processing apparatus in this embodiment will be described first with reference to FIG. 1. FIG. 1 illustrates the characteristics of the smoothing process executed on pixels forming edges by the image processing apparatus comprising several modules in an embodiment of the invention.

In the image processing apparatus in this embodiment, it is determined, on the basis of edge level (gradient g), whether or note the target pixels TP which are the object of the smoothing process (noise reduction process/denoising process) are pixels constituting (forming) edges. If they are edge-forming pixels, a smoothing process is executed using the elliptical median filter in FIG. 1 instead of a moving average filter. The median filter MF used in the example has an elliptical reference area RA which is tilted (angled) to match the orientation (edge angle) of an edge Eg, allowing the smoothing process to be executed without compromising the edges.

Thus, in the smoothing process, the orientation (edge angle) of the edge Eg is determined, a median filter MF with an angle matching the determined edge angle is selected, and the selected median filter MF is used to execute a smoothing process on the target pixel TP which is an edge-forming pixel. Foregoing logics are implemented by CPU 100 alone, or together with ROM 101, HDD 102, and RAM 103. The noise reduction process executed by the image processing apparatus in this embodiment is described in further detail below.

Figure 2:
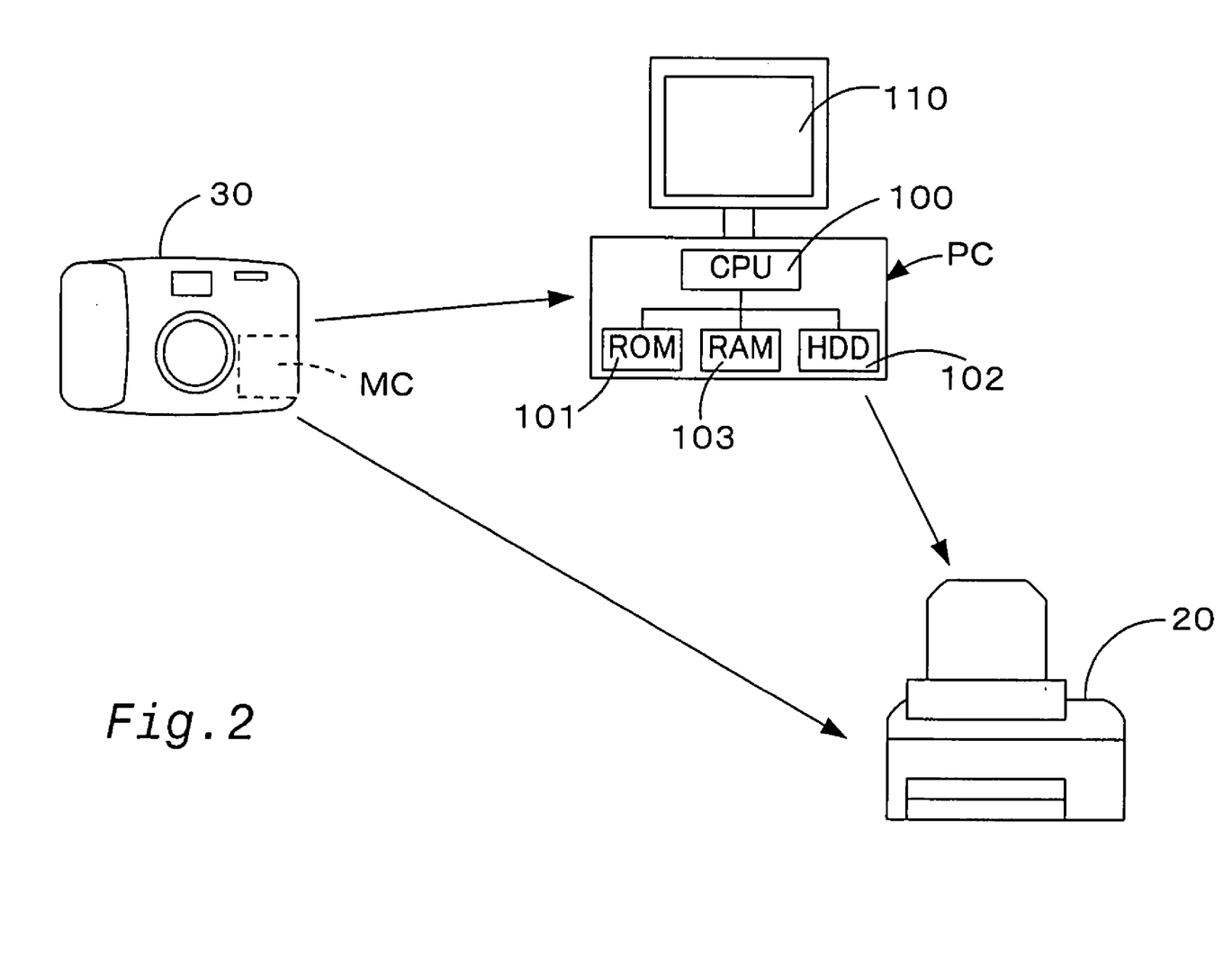
FIG. 2 illustrates the general structure of an image processing system including the image processing apparatus in an embodiment of the invention.

An image processing system including the image processing apparatus of the embodiment is described with reference to FIG. 2. FIG. 2 illustrates the general structure of an image processing system including the image processing apparatus in an embodiment of the invention.

In this embodiment, the image processing apparatus is worked in the form of a personal computer PC. The personal computer PC comprises a central processing unit (CPU) 100 for executing various image processing computations including the noise reduction process, a read-only memory (ROM) 101 for storing programs, reference tables, and the like for running the noise reduction process, a hard disc (HDD) 102, and a random access memory (RAM) 103 for temporarily storing various types of data such as input image data. CPU 100 alone, or together with ROM 101, HDD 102, and RAM 103, constitutes a given logic. The personal computer PC also comprises an input interface for handling data and control signals with an external input device, and an output interface for handling data and control signals with an external output device. An interface logic both contact terminals (hardware) for connecting an external device and conversion processes (software) for signals from external devices.

In this embodiment, a display device 110 and printer 20 are connected as external output devices to the personal computer PC image data reflecting the results of the noise reduction process are sent in real time to the display device 110, displaying the output image. A print command input is triggered to execute the noise reduction process and send print image data converted to print data to the printer 20, where the output image is printed.

A digital style camera 30 is connected as an imaging device to serve as the external input device. The digital style camera 30 is an imaging device which produces image data using a photoelectric transducer such as a CCD. Photographed images are formed through an optical lens onto a CCD, where the optical information (energy) is converted to electrical information (energy). It is thus known that noise tends to be produced in the resulting images of night scenes or indoor scenes where there is not enough light. When images are photographed by increasing the ISO, the noise level is also known to increase. Image data produced by digital style cameras 30 can also be input through a memory card MC to a personal computer PC.

This embodiment will be described with the use of a digital style camera 30 as the external input device in the form of an imaging device, but scanners, digital video cameras, and the like can also be used. Examples of other input devices include keyboards, mouses, and the like.

Figure 3:
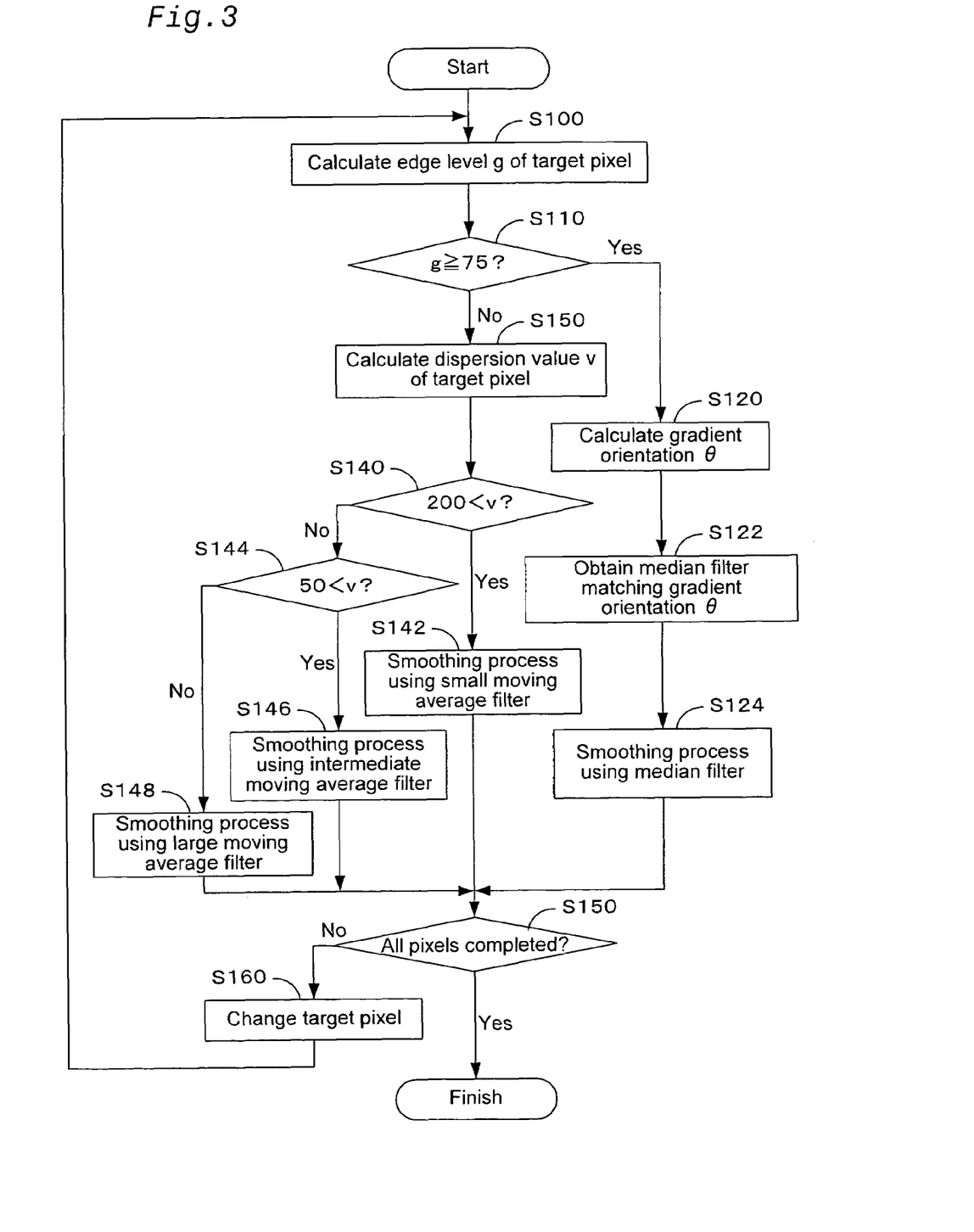
FIG. 3 is a flow chart of the process routine executed in the noise reduction process.
Figure 4A:
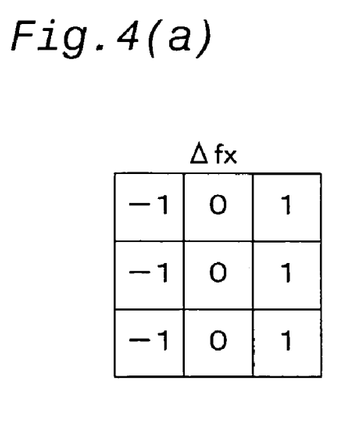
FIGS. 4(a)-4(b) illustrate an example of 3×3 edge detection operators used to determine the edge gradient g (edge level).
Figure 4B:
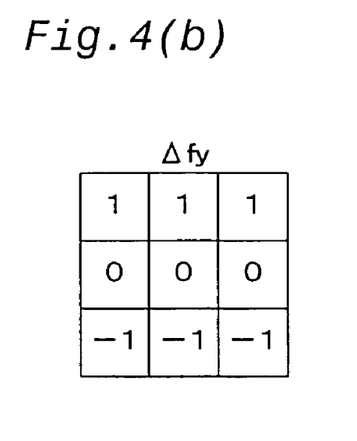
Figure 5A:
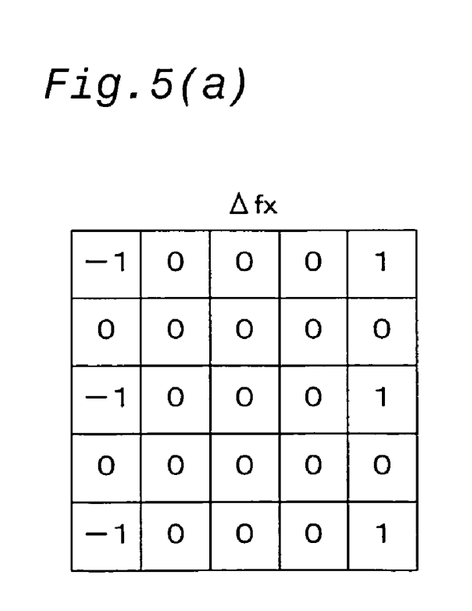
FIGS. 5(a)-5(b) illustrate an example of 5×5 edge detection operators used to determine the edge gradient g (edge level).
Figure 5B:
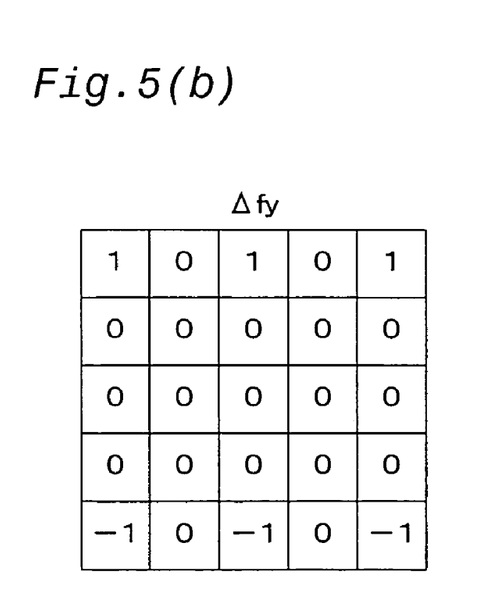
Figure 6A:
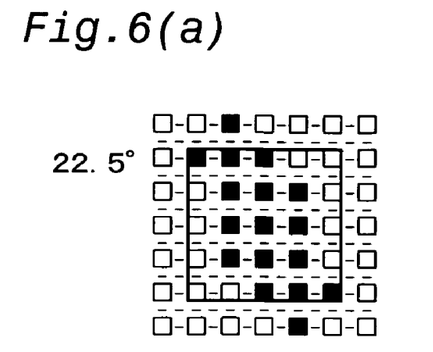
FIGS. 6(a)-6(h) illustrate an example of an elliptical median filter with the orientation of the reference pixel extraction area used in this embodiment.
Figure 6B:
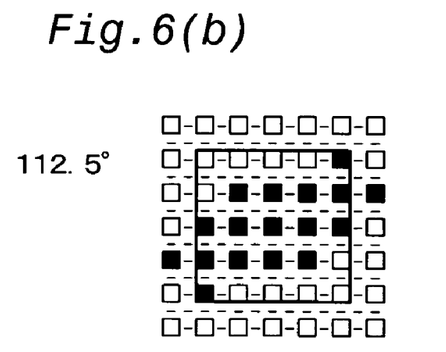
Figure 6C:
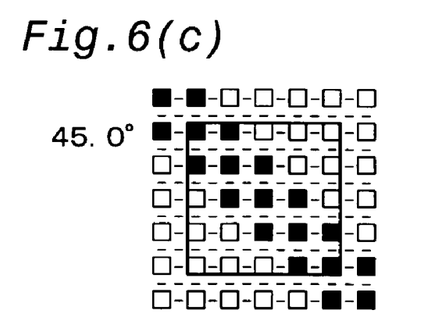
Figure 6D:
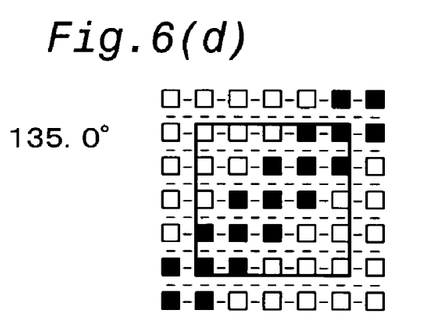
Figure 6E:
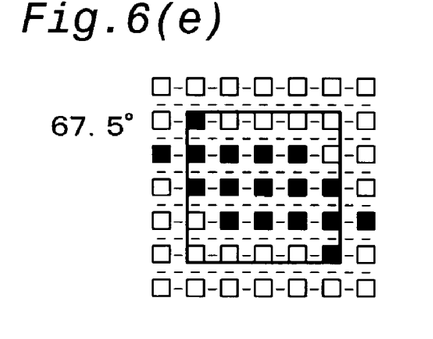
Figure 6F:
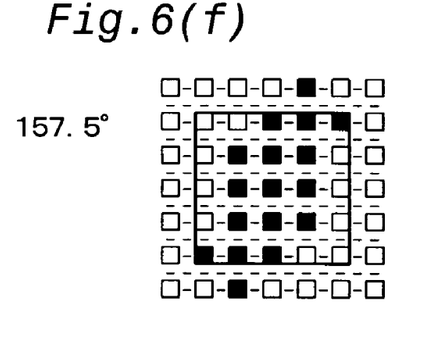
Figure 6G:
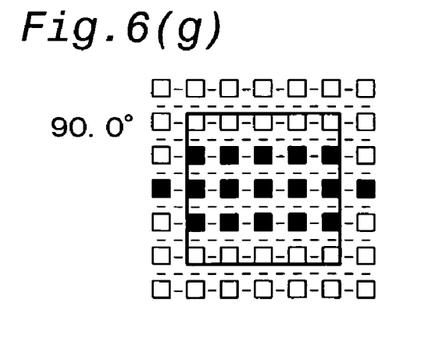
Figure 6H:
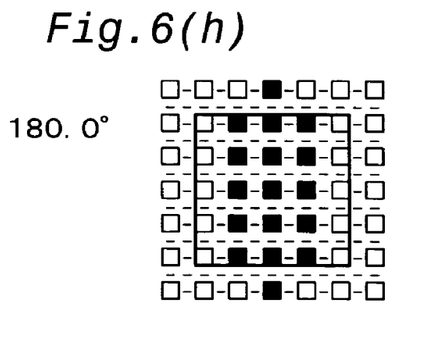
Figure 7:
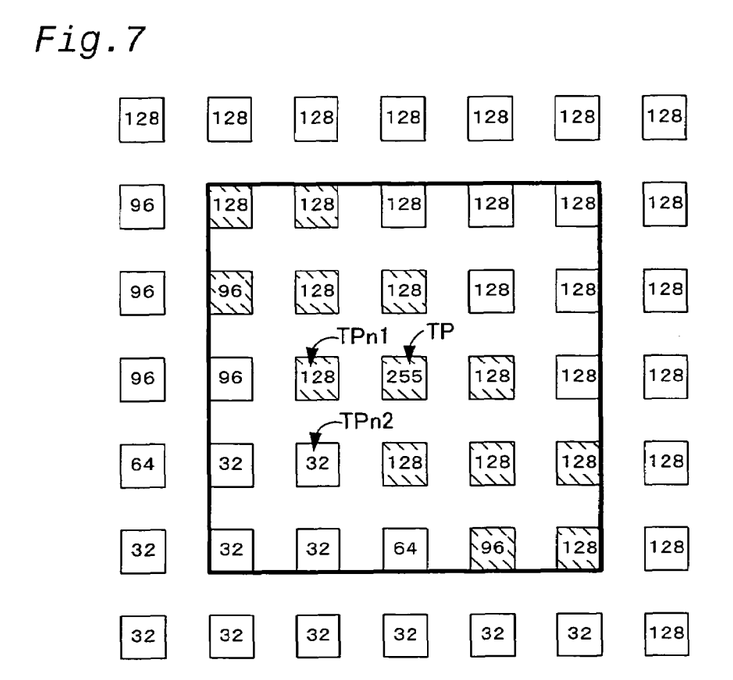
FIG. 7 shows a hypothetical illustration of the application of a median filter during a smoothing process on target pixels TP, showing the distribution of pixel values for the image in FIG. 1 at the level of pixels.
Figure 8:
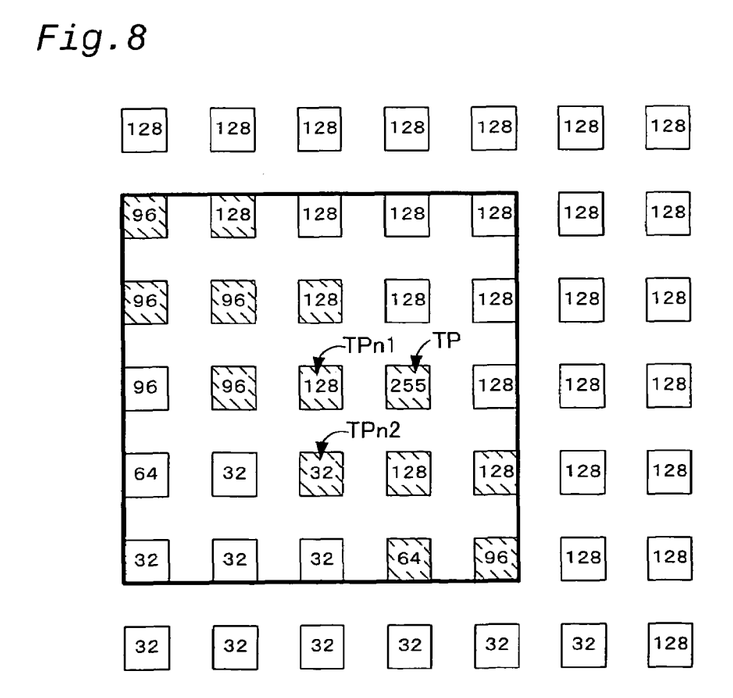
FIG. 8 shows a hypothetical illustration of the application of a median filter during the smoothing process for the target pixel TPn1.
Figure 9:
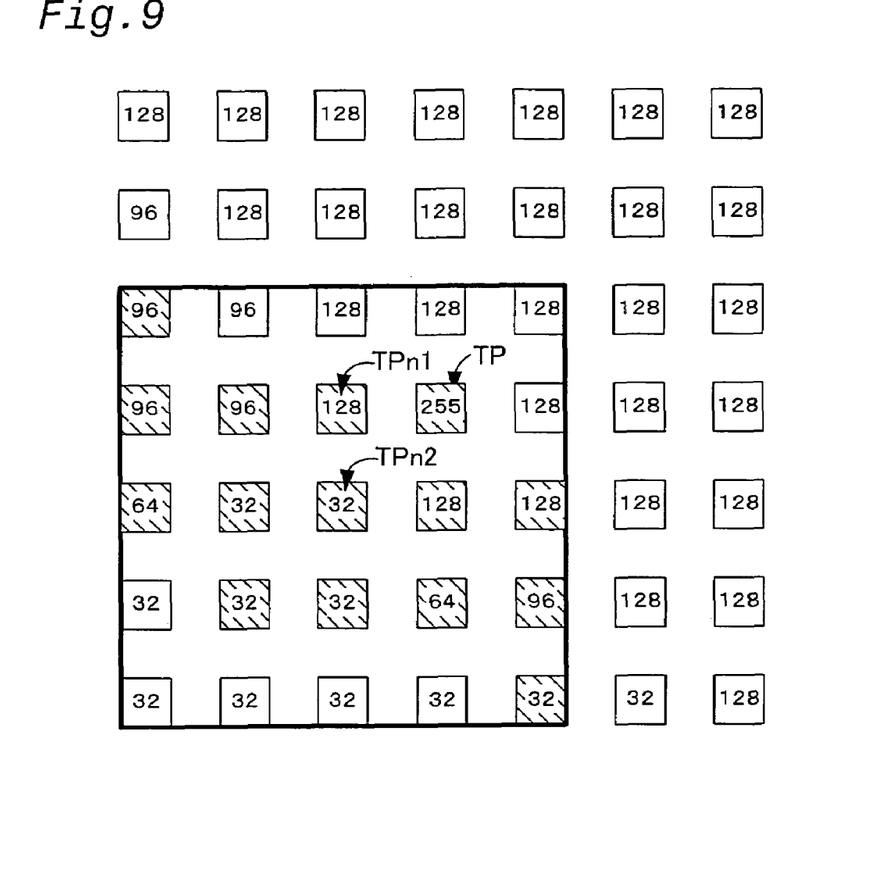
FIG. 9 shows a hypothetical illustration of the application of a median filter during the smoothing process for the target pixel TPn2.
Figure 10:
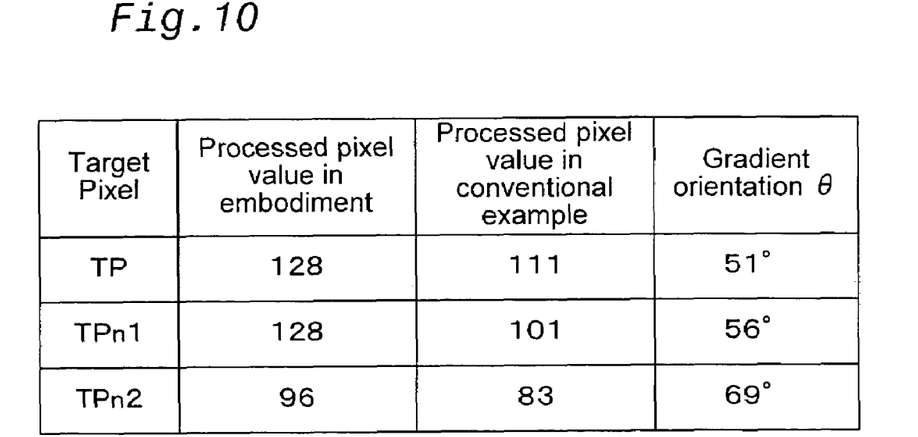
FIG. 10 shows the results of comparison a smoothing process obtained in the embodiment with those obtained in a conventional example.
Figure 11:
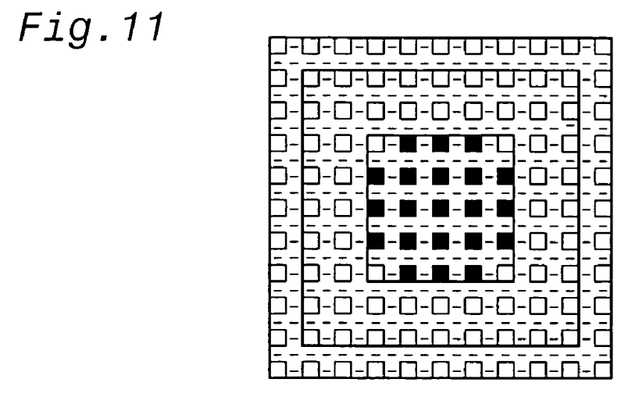
FIG. 11 shows an example of a 9×9 moving average filter used in the embodiment.
Figure 12:
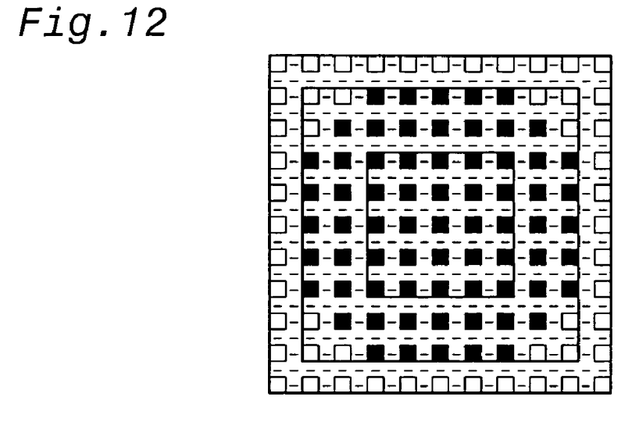
FIG. 12 shows an example of a 17×17 moving average filter used in the embodiment.
Figure 13:
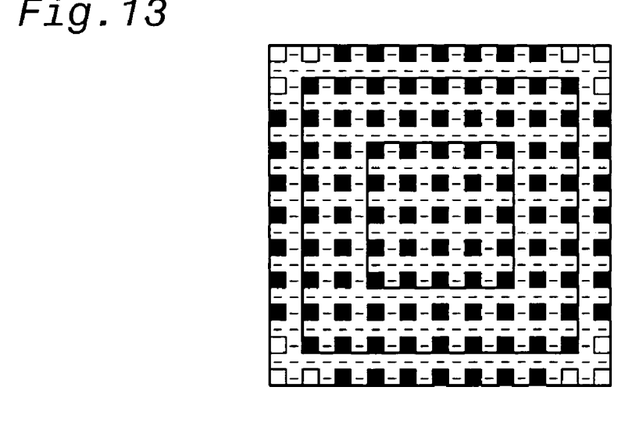
FIG. 13 shows an example of a 21×21 moving average filter used in the embodiment.

The noise reduction process executed by the image processing apparatus in this embodiment will be described with reference to FIGS. 3 through 11. FIG. 3 is a flow chart of the process routine executed in the noise reduction process. FIG. 4 illustrates an example of 3×3 edge detection operators used to determine the edge gradient g (edge level). FIG. 5 illustrates an example of 5×5 edge detection operators used to determine the edge gradient g (edge level). FIG. 6 illustrates an example of an elliptical median filter with the orientation of the reference pixel extraction area used in this embodiment. FIG. 7 is a hypothetical illustration of the application of a median filter during a smoothing process on target pixels TP, showing the distribution of pixel values for the image in FIG. 1 at the level of pixels. FIG. 8 is a hypothetical illustration of the application of a median filter during the smoothing process for the target pixel TPn1. FIG. 9 is a hypothetical illustration of the application of a median filter during the smoothing process for the target pixel TPn2. FIG. 10 compares the results of a smoothing process obtained in the embodiment with those obtained in a conventional example. FIG. 11 is an example of a 9×9 moving average filter used in the embodiment. FIG. 12 is an example of a 17×17 moving average filter used in the embodiment. FIG. 13 is an example of a 21×21 moving average filter used in the embodiment.

The noise reduction process executed in this embodiment will be described with reference to FIG. 3. The noise reduction process may be implemented in cases where, for example, based on image processing conditions or photographing data associated with image data, increased ISO sensitivity is indicated, the photographed scene is in the evening or at night, the white balance is determined by the indoor light, or the image is dark because of the results of image data analysis. It may also be implemented when the user selects the noise elimination command. A technique for writing to image data headers can also be implemented for the relation between image data and image processing conditions or photographing information. The result of the noise reduction process may be reflected in images displayed on the display device 110 or may be reflected on the display device 110.

When the noise reduction process is begun, the personal computer PC (CPU 100) converts the image data to a color coordinate system expressed by brightness and color difference, such as YCbCr or Lab. YCbCr is used in this example. The image data produced by a digital style camera 30 is most often YCbCr data, which requires no particular conversion process. On the other hand, when the data input to a personal computer PC is RGB data, RGB-YCbCr conversion is performed by the following calculations.

$$Y = 0.2999R + 0.587G + 0.114B$$

$$Cr = 0.713(R-Y) \quad Cb = 0.564(B-Y)$$

The CPU 100 calculates the target pixel TP gradient (edge level) based on Y (brightness) and Cb and Cr (color difference) (step S100). Several procedures have already been established for calculating the edge level g. Examples used in this embodiment are the 3×3 Prewitt operators shown in FIG. 4 and the 5×5 Prewitt operators shown in FIG. 5.

When the brightness of the target pixel TP is expressed as Y (ij), the CPU 100 calculates Δfx and Δfy using the following Equations (1) and (2). Equations (1) and (2) are examples of the use of the 3×3 Prewitt operators.

$$\Delta fx = (Y(i+1,j-1) - Y(i-1,j-1)) + (Y(i+1,j) - Y(i-1,j)) + (Y(i+1,j+1) - Y(i-1,j+1)) \quad \text{Equation(1)}$$

$$\Delta fy = (Y(i-1,j-1) - Y(i-1,j+1)) + (Y(i,j-1) - Y(i,j+1)) + (Y(i+1,j-1) - Y(i+1,j+1)) \quad \text{Equation(2)}$$

The CPU 100 then calculated the edge level g using the following Equation (3).

$$g = \sqrt{\Delta fx^2 + \Delta fy^2} \quad \text{Equation(3)}$$

The CPU 100 determines the edge level in the same manner as the Y component for the Cr and Cb components, respectively, and uses the greatest edge level g as the target pixel TP edge level. An example of the use of the 3×3 Prewitt operators was used for convenience in the above embodiment, but nowadays when a greater number of pixels are used to form image data, the use of the 5×5 Prewitt operators is preferred for more accurately determining the edge level g.

The CPU 100 determines whether or not the calculated edge level g is 75 or higher (step S110). If it is 75≦g (step S110: Yes), then the edge angle θ is calculated (step S120). The CPU 100 calculated the edge angle based on Equation (4) below using the previously determined Δfx and Δfy.

$$\theta = \arctan\left(\frac{\Delta fy}{\Delta fx}\right) \quad \text{Equation (4)}$$

However, the angle θ actually calculated by Equation (4) is the orientation θ of the gradient relative to the horizontal direction as shown in FIG. 1, and is not, strictly speaking, the edge angle. However, because the orientation of the gradient is perpendicular (90°) to the orientation of the edge, the gradient orientation θ and the edge orientation (edge angle) are uniquely related, allowing the edge angle to be determined by determining the gradient orientation θ.

The CPU 100 obtains a median filter matching the edge angle on the image based on the calculated gradient orientation θ (step S122). Median filters MF oriented to reference areas RA (reference pixels focused on pixels surrounding the edge), as illustrated in FIGS. 6(a) through (h), are stored in the ROM 101 or HDD 102 of the personal computer PC. The CPU 100 selects a median filter MF matching the edge angle on the image, using the calculated gradient orientation θ as an indicator. In this embodiment, median filters MF with 8 types of orientation in 2.25° increments within the range from 0° to 180° were prepared.

In FIG. 6, the black squares represent reference pixels, and the white pixels represent non-reference pixels, meaning skipped pixels which are not treated as target pixels (not smoothed). The angles in FIG. 6 indicate the gradient orientation θ, not the orientation of the median filter MF (the actual angle formed on the image). That is, the gradient orientation θ and the actual edge angle (orientation) are offset 90°, as noted earlier. In this example, gradient orientation θ and the actual edge angle have been coordinated so as to enable the selection of a median filter MF matching the edge angle on the image using the gradient orientation θ as an indicator in view of the differences noted above.

FIG. 6 depicts a median filter MF with a 9×9 angle for the sake of convenience, but the use of a 17×17 angled median filter MF will be preferred in actual processing.

The CPU 100 executes a smoothing process using the median filter MF that has been obtained (step S124). The smoothing process is implemented only for the color difference components Cr and Cb, not the brightness component Y. In the example given, an image having the edge illustrated in FIG. 1 has the pixel value (color and brightness) distribution illustrated in FIG. 7. Because the target pixel TP gradient orientation θ is 51°, the 45° median filter MF in FIG. 6(b) is selected to execute the median filter computation.

The target pixels in FIGS. 7 through 9 are represented by TP, TPn1, and TPn2. The reference pixels are the squares with the diagonal lines. The non-reference pixels are represented by the white squares. Although there are pixels between the squares, they are not shown, since they are skipped pixels which are not treated as either target pixels or non-reference pixels, in order to speed up the imaging process.

Median values are calculated using the color difference or brightness of the reference pixels indicated by the diagonal lines and the brightness or color of the target pixel TP, giving the color difference of the target pixel TP after the noise reduction process (processed color value). The CPU 100 temporarily stores the processed color value obtained by these calculations in RAM 103. In this example, the target pixel TP had an initial color difference value of 255, and it was highly possible to indicate the noise with reference to the color difference or brightness of the surrounding pixels. When a conventional moving average filter is used, the color difference or brightness of all pixels within the borderline are referenced. As a result, the processed color value of the target pixel TP is 111, and the edges are compromised by the noise reduction process.

By contrast, in the noise reduction process of this embodiment which features the use of an angled median filter MF, a median value of 128 is obtained using the brightness or color difference of the reference pixels and the color value of the target pixel TP, allowing the noise to be reduced without compromising the edges. Because the smoothing process median filter computation) is managed by matching the reference area RA to the edge angle (edge orientation) so as to cover the edge-forming pixels, it is possible to implement a highly accurate noise reduction process that does not compromise edges while shortening the time for calculating the median filter, which normally takes a long time.

A different example of a smoothing process using the angled median filters MF of this embodiment will be described for different target pixels TPn1 and TPn2 with reference to FIGS. 8 through 10. As illustrated in FIG. 10, the gradient orientation θ of the target pixel TPn1 is 56°. The 45.0° median filter MF in FIG. 6(b) is selected to implement the median filter computation. The processed pixel value (color difference) in this example is 128, whereas it would be 101 if a conventional moving average filter were used. The edges are thus not compromised in this example. As shown in FIG. 10, the gradient orientation θ of the target pixel TPn2 is 69°, and the 67.5° median filter MF illustrated in FIG. 6(c) would be selected to run the median filter computations. The processed pixel value (color difference) in this example is 96, whereas it would be 83 if a conventional moving average filter were used. The target pixel TPn2 is far lower than the surrounding pixel values and would be regarded as noise, but in this example, its color difference can be increased as an edge component, allowing the deterioration of the edge due to noise to be overcome.

When the target pixel TP edge level g is less than 75 in step S110 (step S110: No), the CPU 100 calculates the target pixel TP dispersion value for the brightness component Y and the color difference components Cb and Cr, using the greatest value as the dispersion value v for the target pixel TP (step S130). The dispersion value v is determined by the following Equation (5), where xi is either the Y, CB, or CR of the target pixel TP, and x bar is the average of all pixel values for each of Y, Cb, and Cr.

$$v = \frac{1}{n}\sum_{i=1}^{n}(x_i - \bar{x})^2$$ Equation (5)

Because the expressed edge level g will sometimes be low regardless of the fact that the image contains edge components, the dispersion value v is calculated to execute a smoothing process suitable for the edge components contained in the edge. When the dispersion value v is high, it means that the image contains a relatively high edge component, and when the dispersion value v is low, it means that the image does not contain a relatively large edge component. Accordingly, the smoothing process is implemented as follows using a moving average filter that is smaller as the dispersion value v increases.

The CPU 100 determines whether or not the dispersion value v is greater than 200 (step S140). If the dispersion value v is determined to be greater than 200 (step S140: Yes), then the 9×9 moving average filter in FIG. 9, that is, a moving average filter with reference pixels within a 9×9 range, is used in the smoothing process on the target pixel TP (step 142). The CPU 100 temporarily stores the resulting processed color value in RAM 103. In this case, it means that fine components resembling the knitted weave of a sweater, for example, are contained around the target TP. As a result, a filter with a small reference area is used to lower the extent of smoothing so as to implement a smoothing process that does not compromise edge components such as knitting. In FIG. 9 the black squares represent reference pixels, the white squares represent non-reference pixels, and the negative space indicates skipped pixels. The moving average filter used in this example should employ square pixels as reference pixels because it has a reference area corresponding to the Gauss distribution, but in order to shorten the calculation time, square pixels that do not significantly affect the smoothing process are used empirically as non-reference pixels.

When the dispersion value v is 200 or less (step S140: No), the CPU 100 determines whether or not the dispersion value v is greater than 50 (step S144). If the dispersion value v is determined to be greater than 50 (step S144: Yes), then CPU 100 implements a smoothing process on the target pixel TP using the 17×17 moving average filter in FIG. 10 (step S146). The CPU 100 temporarily stores the resulting processed color value in RAM 103. The black and white squares and negative space in FIG. 10 mean the same as above.

When the dispersion value v is determined to be 50 or less (step S144: No), the CPU 100 used the 21×21 moving average filter in FIG. 11 to run the smoothing process on the target pixel TP (step S148). The CPU 100 temporarily stores the resulting processed color value in RAM 103. In this case, it means that relatively uniform pixels representing space, for example, are contained around the target pixel TP. As a result, a filter with a large reference area is used to increase the extent of smoothing so as to implement a more powerful smoothing process that emphasizes noise reduction. The black and white squares and negative space in FIG. 11 mean the same as above.

When the CPU completes any of the above smoothing processes on the current target pixel TP, it determines whether or not the smoothing process has been completed for all pixels (except skipped pixels) (step S150). If it is determined that not all pixels (except skipped pixels) have completed the smoothing process (step S150: No), then the target TP is changed (step S160) and the process returns to step 100 to implement the above noise reduction processes on the next target pixel TP. If, on the other hand, it is determined that all pixels (except skipped pixels) have completed the smoothing process (step S150: Yes), the noise reduction process is complete. The CPU 100 applies the temporarily stored processed color values for the pixels to the corresponding pixels on the original image, converts the YCbCr data to RGB data, and then outputs the data to a data converter, such as a print driver, which converts the processed image data after any other image processes into a form suitable for an output device. The printer driver (CPU 100) converts the RGB data to CMYK data as befits the printer color space, runs any necessary processes such as half tone processing, then outputs the results in the form of raster data, for example, to a printer 20.

As described above, according to the image processing apparatus in this embodiment, when an image contains edge components with a sizable edge level, the smoothing process is implemented using angled median filters MF having reference areas (smoothing areas) matching the orientation of the edges. When the image does not contain edge components with a sizable edge level, the smoothing process can be implemented using moving average filters that are of sizes that differ according to the dispersion value v. It is thus possible to reduce or eliminate the noise in images without compromising the edges in the images (without smoothing the edges).

More specifically, it is possible to execute a noise reduction process that preserves edges because the smoothing process (noise reduction process) involves the use of a median filter MF matching the orientation of the edge (edge angle) of the target pixel forming the distinct edge component. That is, the invention overcomes the problems of blurring and indistinctness associated with conventional noise reduction which involves the use of moving average filters. It is also possible to drastically reduce the computation time required in computing median filters, which has been another problem in the conventional use of median filters. It is thus possible to powerfully reduce or eliminate nose in images while preserving the edge components in images with edges.

The smoothing process also employs moving average filter sizes according to the dispersion value v of the target pixel for target pixels which do not constitute distinct edges. The dispersion value v is a useful indicator for determining whether or not the target pixel constitutes an indistinct edge. A filter of a small size is used for target pixels forming indistinct edges to execute a smoothing process which does not compromise edge components, while a powerful smoothing process can be run by using filters of a large size for target pixels that do not form edges. It is thus possible to implement a smoothing process that is capable of more powerful noise reduction in parts that have no edge components without compromising the edges in an image compared to conventional smoothing processes in which moving average filters of different sizes are used according to image size.

In this example, the Y, Cb, and Cr components were determined to calculate the edge level g and dispersion value v, and the greatest value was used as the edge level g and dispersion value v of the target pixel TP, but only the color difference components Cb and Cr were the objects of the smoothing process. It is thus possible to eliminate or reduce color noise while preventing blurring associated with decreased brightness.

Other Embodiments

The noise reduction process was done using a personal computer PC s the image processor, but it is also possible to use stand alone printers equipped with image processing functions as the image processor. In such cases, the noise reduction process is run by the printer. The process can also be run in the form of printer drivers or image processing applications (programs), without hardware structures such as image processing apparatuses.

Prewitt operators were used to detect edges in the above example, but other operators such as Roberts operators and Sobel operators, as well as Laplacian filters or the like can be used to detect edges (detect edge levels).

The color difference components Cb and Cr were the objects of the smoothing process in the above example, but a smoothing process can also be run on the brightness component Y, of course.

The use of median filters with elliptical extraction areas was exemplified in the above examples, but the same effects can also be obtained with extraction areas that are wide in the direction parallel to, and narrow in the direction perpendicular to, the edge orientation.

The image processing apparatus, noise reduction method, and noise reduction program of the invention were described in the above example, but the above embodiments were used only to illustrate the invention and do not in any way limit the invention. The invention is capable of various modifications and improvements within the sprit and scope of the invention, and the invention will also, of course, include their equivalents.

What is claimed is:

1. A method for executing a noise reduction process to images composed of a plurality of pixels, the method comprising:
   calculating an edge level in target pixels that are an object of a smoothing process;
   determining an edge angle that is an angle of an array of edge-forming pixels including the target pixels based on the calculated edge level;
   obtaining a filter that has orientation properties extracting pixels in a given direction as reference pixels and matching the determined edge angle, wherein the filter is a median filter and the filter has an extraction area which is wider in a direction parallel to than in a direction perpendicular to the given direction;
   executing a first smoothing process on the target pixels using the filter that has been obtained;
   when the calculated edge level is lower than a prescribed edge level, calculating a size of an edge component of the target pixels; and
   executing a second smoothing process on the target pixels using a moving average filter having extraction areas that are smaller as the calculated size of the edge component increases.

2. A method according to claim 1 further comprising:
   separating pixel values of an image by color difference components and brightness components,
   wherein the edge level of the target pixels is calculated by calculating edge levels for the color difference and brightness components, and the edge level of the target pixels is the greatest edge level among the calculated edge levels, a size of the edge component of the target pixels is calculated by calculating sizes of the edge component for the color difference and brightness components, and the size of the edge component of the target pixels is the greatest size of the edge component among the calculated sizes of the edge component, and the first and second smoothing processes are only executed on the color difference components of the target pixels.

3. A method for executing a noise reduction process to images composed of a plurality of pixels, the method comprising:

calculating an edge level in target pixels which are an object of a smoothing process;

calculating a gradient of the target pixels based on the calculated edge level;

obtaining a filter matching an edge angle on an image using the calculated gradient based on a predetermined relationship between the edge angles and the gradients, wherein the edge angle is an angle of an array of edge-forming pixels on the image, wherein the filter is a median filter, and has orientation properties that extracts pixels oriented in a same angle direction as the edge angle and an extraction area which is wider in a direction parallel to than in a direction perpendicular to a given direction;

executing a first smoothing process on the target pixels using the filter that has been obtained;

when the calculated edge level is lower than a prescribed edge level, calculating a size of an edge component of the target pixels; and executing a second smoothing process on the target pixels using a moving average filter having extraction areas that are smaller as the calculated size of the edge component increases.

4. A method according to claim 3 further comprising:

separating pixel values of the image by color difference components and brightness components, wherein the edge level of the target pixels is calculated by calculating edge levels for the color difference and brightness components, and the edge level of the target pixels is the greatest edge level among the calculated edge levels, a size of the edge component of the target pixels is calculated by calculating sizes of the edge component for the color difference and brightness components, and the size of the edge component of the target pixels is the greatest size of the edge component among the calculated sizes of the edge component, and the first and second smoothing processes are only executed on the color difference components of the target pixels.

5. An image processing apparatus for executing a noise reduction process to images composed of a plurality of pixels, the image processing apparatus comprising:

an edge level calculating module that calculates an edge level in target pixels that are an object of a smoothing process;

an edge angle determination module that determines an edge angle that is an angle of an array of edge-forming pixels including the target pixels based on the calculated edge level;

a memory module that stores a plurality of filters in accordance with edge angles, wherein each filter has orientation properties that extracts pixels in a given direction as reference pixels;

a filter selection module that selects a filter with orientation properties matching the determined edge angle from the memory module;

a first smoothing module that executes a smoothing process on the target pixels using the selected filter;

a size of an edge component calculating module that calculates a size of an edge component of the target pixels when the calculated edge level is lower than a prescribed edge level; and a second smoothing module that executes a smoothing process on the target pixels using a moving average filter having extraction areas that are smaller as the calculated size of the edge component increases when the calculated edge level is lower than the prescribed edge level.

6. An image processing apparatus according to claim 5, further comprising:

a separating module that separates pixel values of the image by color difference components and brightness components;

wherein the edge level of the target pixels is calculated by calculating edge levels for the color difference and brightness components, and the edge level of the target pixels is the greatest edge level among the calculated edge levels, the size of the edge component of the target pixels is calculated by calculating sizes of the edge component for the color difference and brightness components, and the size of the edge component of the target pixels is the greatest size of the edge component among the calculated sizes of the edge component, and the first and second smoothing process are only executed on the color difference components of the target pixels.

7. An image processing apparatus for executing a noise-reduction process to images composed of a plurality of pixels, the image processing apparatus comprising:

an edge level calculating module that calculates an edge level in target pixels that are an object of a smoothing process;

a gradient calculating module that calculates a gradient of the target pixels based on the calculated edge level;

a memory module that stores a plurality of filters associated with the gradient for a plurality of edge angles, wherein each filter has orientation properties that extracts pixels oriented in a same angle direction as the edge angle, which is an angle of an array of edge-forming pixels on an image;

a filter selection module that selects a filter matching the edge angle on the image from the memory module based on the calculated gradient; and a first smoothing module that executes a smoothing process on the target pixels using the selected filter a size of an edge component calculating module that calculates a size of an edge component of the target pixels when the calculated edge level is lower than a prescribed edge level; and a second smoothing module that executes a smoothing process on the target pixels using a moving average filter having extraction areas that are smaller as the calculated size of the edge component increases when the calculated edge level is lower than the prescribed edge level.

8. An image processing apparatus according to claim 7 further comprising:

a separating module that separates pixel values of the image by color difference components and brightness components;

wherein the edge level of the target pixels is calculated by calculating edge levels for the color difference and brightness components, and the edge level of the target pixels is the greatest edge level among the calculated edge levels, the size of the edge component of the target pixels is calculated by calculating sizes of the edge component for the color difference and brightness components, and the size of the edge component of the target pixels is the greatest size of the edge component among the calculated sizes of the edge component, and the first and second smoothing process are only executed on the color difference components of the target pixels.

9. A computer readable medium that stores a program for executing a noise reduction process to images composed of a plurality of pixels, said program being executed on a computer to implement:

a function for calculating an edge level in target pixels that are an object of a smoothing process;

a function for determining an edge angle that is an angle of an array of edge-forming pixels including the target pixels based on the calculated edge level;

a function for obtaining a filter that has orientation properties extracted using pixels in a given direction as reference pixels and has orientation properties matching the determined edge angle;

a function for executing a first smoothing process on the target pixels using the filter that has been obtained;

when the calculated edge level is lower than a prescribed edge level, a function for calculating a size of an edge component of the target pixels; and a function for executing a second smoothing process on the target pixels using a moving average filter having extraction areas that are smaller as the calculated size of the edge component increases.

10. A computer readable medium according to claim 9 further comprising:

a function for separating pixel values of the image by color difference components and brightness components;

wherein the edge level of the target pixels is calculated by calculating edge levels for the color difference and brightness components, and the edge level of the target pixels is the greatest edge level among the calculated edge levels, the size of the edge component of the target pixels is calculated by calculating sizes of the edge component for the color difference and brightness components, and the size of the edge component of the target pixels is the greatest size of the edge component among the calculated sizes of the edge component, and the first and second smoothing processes are only executed on the color difference components of the target pixels.

11. A computer readable medium that stores a program for executing a noise reduction process to images composed of a plurality of pixels, said program being executed on a computer to implement:

a function for calculating an edge level in target pixels which are an object of a smoothing process;

a function for calculating a gradient of the target pixels based on the calculated edge level;

a function for obtaining a filter matching an edge angle on an image using the calculated gradient based on a predetermined relationship between edge angles and the gradients, wherein an edge angle is an angle of an array of edge-forming pixels on the image, wherein the filter has orientation properties that extracts pixels oriented in a same angle direction as the edge angle;

a function for executing a first smoothing process on the target pixels using the filter that has been obtained;

when the calculated edge level is lower than a prescribed edge level, a function for calculating a size of an edge component of the target pixels; and a function for executing a second smoothing process on the target pixels using a moving average filter having extraction areas that are smaller as the calculated size of the edge component increases.

12. A computer readable medium according to claim 11 further comprising:

a function for separating pixel values of the image by color difference components and brightness components;

wherein the edge level of the target pixels is calculated by calculating edge levels for the color difference and brightness components, and the edge level of the target pixels is the greatest edge level among the calculated edge levels, the size of the edge component of the target pixels is calculated by calculating sizes of the edge component for the color difference and brightness components, and the size of the edge component of the target pixels is the greatest size of the edge component among the calculated sizes of the edge component, and the first and second smoothing processes are only executed on the color difference components of the target pixels.

* * * * *